United States Patent
Quan et al.

(10) Patent No.: US 8,758,617 B2
(45) Date of Patent: Jun. 24, 2014

(54) WASTEWATER PROCESSING METHOD OF HYDROLYSIS-ACIDIFICATION ENHANCED BY ADDITION OF ZERO-VALENT IRON (ZVI)

(75) Inventors: Xie Quan, Liaoning (CN); Yaobin Zhang, Liaoning (CN); Yiwen Liu, Liaoning (CN); Huimin Zhao, Liaoning (CN); Shuo Chen, Liaoning (CN); Yang Yang Li, Liaoning (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 13/981,887

(22) PCT Filed: Sep. 21, 2011

(86) PCT No.: PCT/CN2011/079913
§ 371 (c)(1),
(2), (4) Date: Jul. 25, 2013

(87) PCT Pub. No.: WO2012/100551
PCT Pub. Date: Aug. 2, 2012

(65) Prior Publication Data
US 2014/0061125 A1    Mar. 6, 2014

(30) Foreign Application Priority Data
Jan. 25, 2011 (CN) .......................... 2011 1 0026692

(51) Int. Cl.
*C02F 3/30* (2006.01)
*C02F 3/28* (2006.01)
(52) U.S. Cl.
USPC .......................................... 210/605; 210/631
(58) Field of Classification Search
CPC ......... C02F 11/04; C02F 3/28; C02F 2305/00
USPC ........................................ 210/603, 605, 631
See application file for complete search history.

(56) References Cited

U.S. PATENT DOCUMENTS

2004/0133059 A1   7/2004  Scalzi et al.
2007/0267346 A1*  11/2007 Sengupta et al. ............. 210/610

FOREIGN PATENT DOCUMENTS

| CN | 1785839 A | 6/2006 |
| CN | 101054226 A | 10/2007 |
| CN | 101302053 A | 11/2008 |
| CN | 101624250 A | 1/2010 |
| CN | 101624250 A * | 1/2010 |
| CN | 102120674 A | 7/2011 |
| WO | WO 98/49106 A1 * | 11/1998 |
| WO | WO-2009/042228 A1 | 4/2009 |

* cited by examiner

*Primary Examiner* — Fred Prince
(74) *Attorney, Agent, or Firm* — Muncy, Geissler, Olds & Lowe, P.C.

(57) ABSTRACT

The invention discloses a wastewater processing method of hydrolysis-acidification enhanced by addition of zero-valent iron (ZVI), including the following steps: 3~6 ZVI-filling layers are settled in the middle of an anaerobic hydrolysis-acidification reactor. Excess sludge taken from sewage treatment plant using as seed sludge is added into this anaerobic hydrolysis-acidification reactor for startup and domestication. In the present invention, ZVI are added into this anaerobic hydrolysis-acidification reactor to accelerate organic matters degradation and produce more acetic acids, accompanied with higher COD removal obtained. ZVI can be protected from rust in this anaerobic biological environment due to the air isolation. Also, ZVI can enhance anaerobic hydrolysis of wastewater through reducing refractory pollutants involved in wastewaters. This novel method made the effluent from the hydrolysis-acidification reactor present less COD concentration and simpler substrate form, benefiting for the following anaerobic methanogenesis or aerobic treatment.

1 Claim, 3 Drawing Sheets

Figure 1:
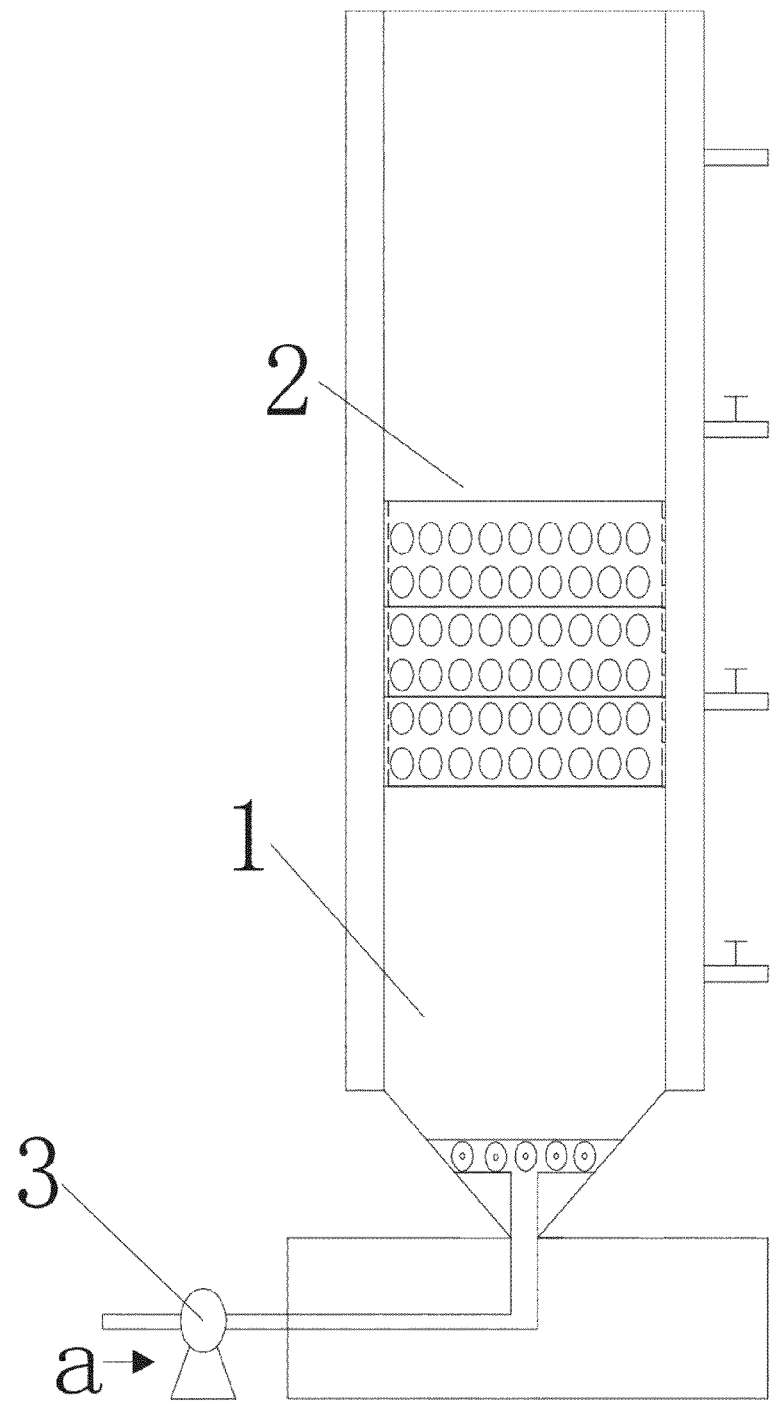

WASTEWATER PROCESSING METHOD OF HYDROLYSIS-ACIDIFICATION ENHANCED BY ADDITION OF ZERO-VALENT IRON (ZVI)

TECHNICAL FIELDS

The invention relates to a sewage treatment technology, especially to the hydrolysis-acidification processing enhanced by ZVI.

BACKGROUND ART

Many industries discharge high-strength organic wastewaters with low biodegradability. These effluents are difficult to treat because of containing toxic substances and of its high chemical stability. It poses a great risk to the environment and human health once these effluents enter into water body. Therefore, it has always been a difficult problem in wastewater treatment.

Anaerobic hydrolysis-acidification process as the first stage of anaerobic fermentation can reduce the macromolecules and non-biodegradable organics of the sewage to biodegradable micro-molecular organics, making them easier to be degraded in the following treatment. Compared to the whole-process anaerobic technology which must go through methanogenic stage, anaerobic hydrolysis-acidification is of short HRT, convenient operation and quick startup. Small molecule carboxylic acid formed in this stage is available for the utilization in the consequent anaerobic or aerobic process. Therefore, anaerobic hydrolysis-acidification is preferable and widely used in sewage treatment, especially in industrial wastewater treatment. In that case, the wastewater after anaerobic hydrolysis-acidification is directly discharged into aerobic treatment to avoid anaerobic methanogenesis because the later needs a long-term HRT and a strictly operational condition.

Technical Problems

The main target of the anaerobic hydrolysis-acidification process in practice is to improve the biodegradability of the wastewater through decomposing complex organic matter into small molecular carboxylic acid. However the ratio of hydrolysis-acidification is often limited by the operational conditions including wastewater types, contaminants involved and temperature. As results, the hydrolysis-acidification of the wastewater is not complete and COD removal in this stage is low, generally less than 30% in practice. It will significantly increase the treating costs in the further processes. On the other hand, utilization degrees of various organic acids such as acetate, propionate, butyrate, etc. produced in hydrolysis-acidification for subsequent biological treatment process are quite different. For example, acetate is a suitable substrate for methanogens, while propionate may restrain the methanogenesis. Therefore, in order to reduce operating costs and improve treatment efficiency, it is necessary to enhance the hydrolysis-acidification, thus increasing mineralization of organic matters and forming acetic acid beneficial to following biological treatment.

As a cheap and environmentally friendly reductant, zero-valent iron (ZVI) has received much attention in the field of pollution control in recent years. In many cases, ZVI technology is served as the pretreatment measure to improve the biodegradability prior to biotreatment, which can increase the biodegradability to promote the efficiency of the subsequent treatment. However, ZVI is easily to rust and then be passivated, which limits its successful application.

In our patent application 200910012293.4, A Method of Zero-valent Iron in Wastewater Treatment, ZVI is put in a single anaerobic reactor. But this method is mainly focused on the enhanced methanogenesis rather than hydrolysis-acidification. Methanogenesis is of long hydraulic retention time required, which may decrease the function of the ZVI in the hydrolysis-acidification.

Solutions

In order to address the problems above, we put forward a novel strategy relates to anaerobic hydrolysis-acidification for enhancing COD removal performance in the hydrolysis-acidification stage, producing acetate for the follow-up process, and improving the stability and processing capacity of the whole system by addition of ZVI.

A wastewater processing method of hydrolysis-acidification enhanced by addition of ZVI includes the following steps, A. 3~6 ZVI-filling layers (2) are settled in the middle of the anaerobic hydrolysis-acidification reactor (1), at the bottom of which the wastewater is pumped (3) into and passes through the ZVI layers. After the interaction among microorganism, wastewater and ZVI, the wastewater is discharged from the upper part of the reactor into the subsequent anaerobic or aerobic process.

B. Excess sludge taken from sewage treatment plant as seed sludge is used for start-up and domestication of this reactor (1).

Specific steps of A above are as follows:

A1. Scrap iron of 5~10 mm is selected to dip in the NaOH of 0.1 mol/L, and then to pickle in the HCL of 10%, finally to wash by water to remove surface greasy dirt as well as rust. The treated ZVI is dried for reserve.

A2. The dry ZVI is added in the ZVI-filling layers.

A3. ZVI-filling layers (2) are settled in the anaerobic hydrolysis-acidification reactor (1). After equipping, the top cover is closed.

A4. High-strength organic wastewater with the pH of 5~6 is kept supplying to the anaerobic hydrolysis-acidification reactor (1) by the pump (3), gradually increasing the load.

A5. Sewage is kept in the anaerobic hydrolysis-acidification reactor (1) for 2~6 h.

Advantageous Effects of the Invention

1. ZVI-filling layers are settled in the anaerobic hydrolysis-acidification reactor to improve the COD removal efficiency and acetic acid production because of the coupling effects between the hydrolysis-acidification bacteria and ZVI. Its advantageous effects are as follows.

Firstly, the acidification of organics is accelerated by ZVI because ZVI can increase the enzyme activity related to hydrolysis-acidification by 2-48 times. Secondly, acetate production is promoted and propionate fermentation is reduced in hydrolysis-acidification tank, providing favorable substrate for consequent methanogenesis. Thirdly, the acidic environment in hydrolysis-acidification may promote the dissolution of ZVI to maintain its activity.

2. In the reactor, 3~6 ZVI-filling layers are settled in the middle of the anaerobic hydrolysis-acidification tank, and the rust formation rate can be significantly reduced due to anaerobic environment. Meanwhile, the degradation of organics is effectively enhanced in the anaerobic hydrolysis-acidification tank with dosing of ZVI, which may produce more acetic acid that is a desired substrate for the subsequent methanogenesis. The acidic environment of the hydrolysis-acidification tank is helpful for the dissolution of ZVI to maintain its activity. The reactor is reasonably designed with stable performance and strong shock resistance in anaerobic treatment of various wastewaters. Tests in lab scale showed that the COD removal efficiency of this system with strong acid producing ability can reach more than 50%.

Due to the above reasons, the anaerobic methanogenesis may be well- operated even under high feeding load or low temperature. Compared with the reference reactor, the performance of this coupling is enhanced significantly.

SCHEMATIC DIAGRAM

FIG. 1. A schematic diagram for the anaerobic hydrolysis-acidification reactor enhanced by addition of ZVI.

Figure 2:
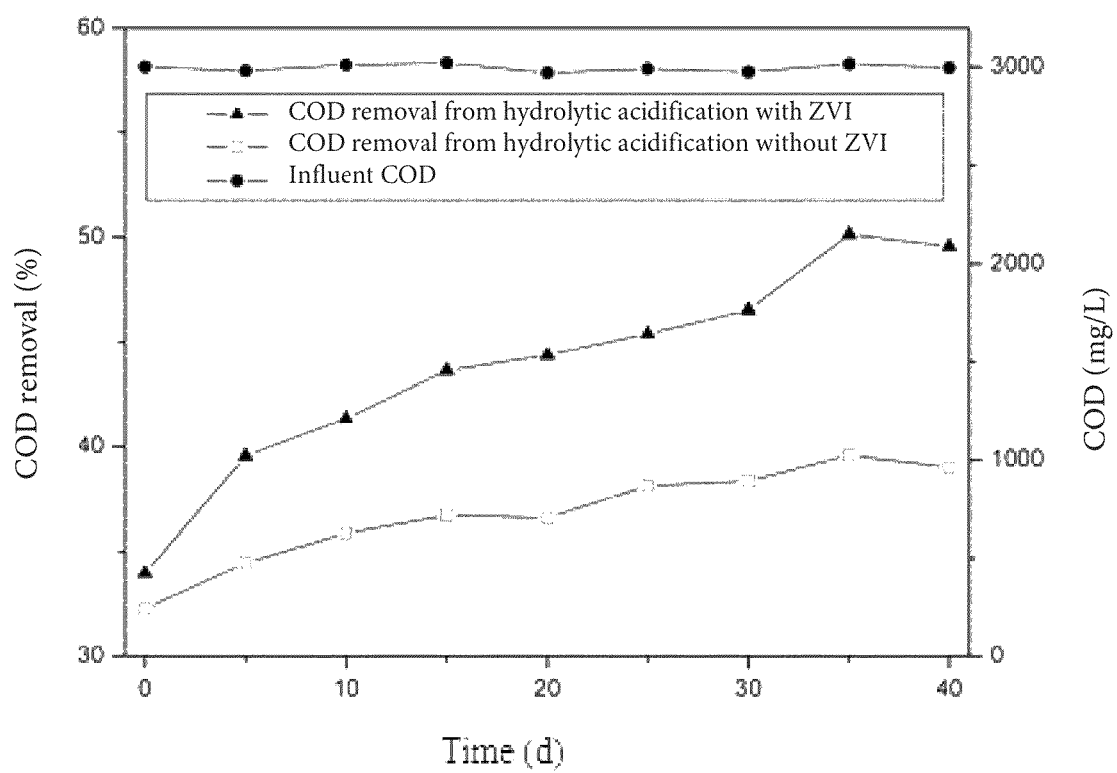

FIG. 2. Correlation curves for influent COD of startup phase as well as COD removal efficiency used synthetic glucose wastewater.

Figure 3:
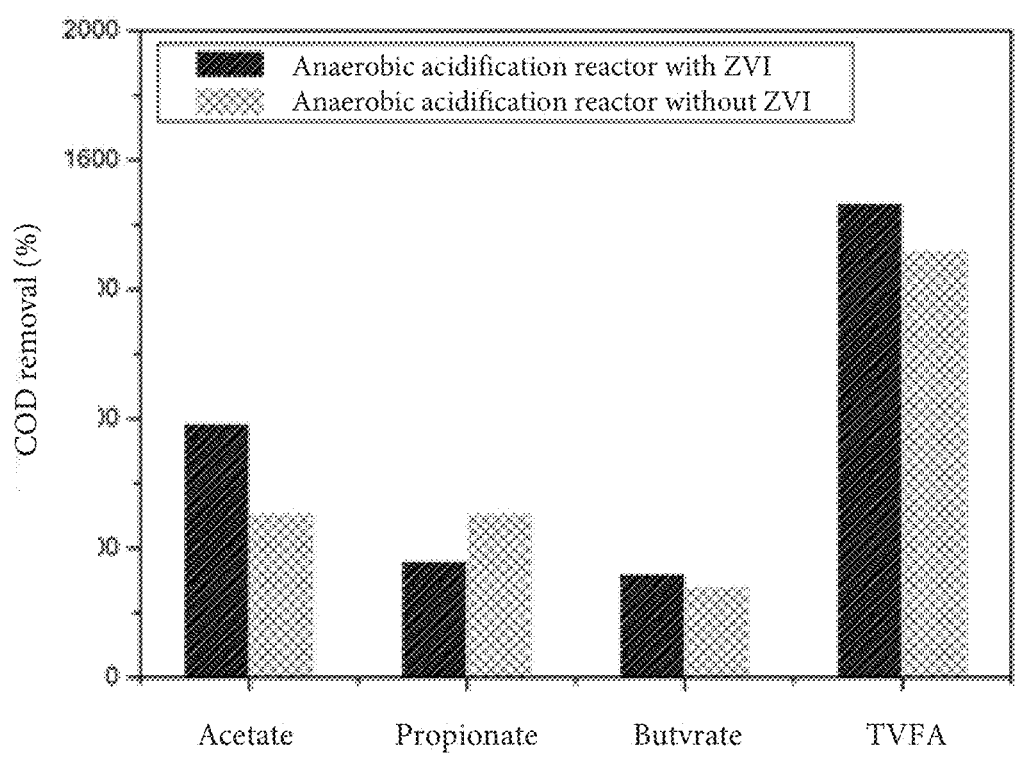

FIG. 3. Correlation curves for all kinds of volatile fatty acids (VFA) in the effluent of startup phase used synthetic glucose wastewater.

1. Anaerobic hydrolysis-acidification reactor, 2. ZVI-filling layers, 3. Inlet pump, 4. Wastewater

MODEL FOR INVENTION

Further instructions for the invention are illustrated in appended drawings below. As shown in FIG. 1, a sewage processing method of hydrolysis-acidification enhanced by addition of ZVI, including the following steps:

A. 3~6 ZVI-filling layers (2) are settled in the middle of the anaerobic hydrolysis -acidification reactor (1), at the bottom of which the wastewater is pumped (3) into and passes through the ZVI layers. After the interaction among microorganism, wastewater and ZVI, the wastewater is discharged from the upper part of the reactor into the subsequent anaerobic or aerobic process.

B. Excess sludge taken from sewage treatment plant as seed sludge is used for start-up and domestication of this reactor (1).

Specific steps of A above are as follows:

A1. Scrap iron of 5~10 mm is selected to dip in the NaOH of 0.1 mol/L, and then to pickle in the HCL of 10%, finally to wash by water to remove surface greasy dirt as well as rust. The treated ZVI are dried for reserve.

A2. The dry ZVI are added to the ZVI-filling layers (2).

A3. ZVI-filling layers (2) are settled in the anaerobic hydrolysis-acidification reactor (1). After equipping, the top cover of (1) is closed.

A4. High-strength organic wastewater with the pH of 5~6 is kept supplying to the anaerobic hydrolysis-acidification reactor (1) by the pump (3), gradually increasing the load of wastewater (4).

A5. Wastewater (4) is kept in the anaerobic hydrolysis-acidification reactor (1) for 2~6 h.

FIG. 1 is the anaerobic-hydrolysis acidification reactor (1) whose shell is made of plexiglass with an inner diameter of 12 cm and a height of 30 cm. ZVI-filling layers (2) are settled in the middle of anaerobic hydrolysis-acidification reactor (1).

After entering the anaerobic hydrolysis-acidification reactor (1) by the pump (3), wastewater (4) flows through ZVI filling layers (2).

The working process of the invention is as follows: At first, wastewater (4) is fed into the bottom of the anaerobic hydrolysis-acidification reactor (1) through the pump (3), fully contacting with the organisms of the sludge during the rising process, then passing the ZVI-filling layers (2) to reach the outlet. Synthetic glucose wastewater is used to startup the anaerobic hydrolysis-acidification reactor (1). During the process, high-strength organic wastewaters (4) with the pH of 5~6 is supplied to the anaerobic hydrolysis-acidification reactor (1) by the pump. With gradual increase of the load of wastewater (4), HRT is decreased.

FIGS. 2 and 3 show the result of synthetic glucose wastewater treatment by the invention. In FIG. 2, x-axis is operating days, and y-axis is COD values. The three curves are COD in the influent, the effluent of hydrolysis-acidification enhanced by ZVI, and the effluent at control hydrolysis-acidification, respectively. In FIG. 3, x-axis is the type of volatile fatty acids (VFA) of each reactor, and y-axis is VFA values. The two curves are VFA for the effluent at hydrolysis acidification enhanced by ZVI and the control one, respectively. According to FIGS. 2 and 3, It can be seen that COD removals of the anaerobic hydrolysis-acidification reactor (1) enhanced by ZVI are significantly higher than that of the control one, the same applies to the acid output, especially the acetate.

We claim:

1. A wastewater processing method of hydrolysis-acidification enhanced by addition of zero-valent iron (ZVI), including the following steps:
    (a) 3~6 ZVI-filling layers (2) are settled in the middle of the anaerobic hydrolysis-acidification reactor (1), at the bottom of which the wastewater is pumped (3) into and passes through the ZVI layers, and, after the interaction among microorganism, wastewater and ZVI, the wastewater is discharged from the upper part of the reactor into the subsequent anaerobic or aerobic process; and
    (b) excess sludge taken from sewage treatment plant as seed sludge is used for start-up and domestication of this reactor (1),
    wherein step (a) includes the following sub-steps:
    (a1) scrap iron of 5~10 mm is selected to dip in the NaOH of 0.1 mol/L, and then to pickle in the HCL of 10%, finally to wash by water to remove surface greasy dirt as well as rust, and the treated ZVI are dried for reserve;
    (a2) the dry ZVI are added to the ZVI-filling layers;
    (a3) ZVI-filling layers (2) are settled in the middle of the anaerobic hydrolysis-acidification reactor (1), and, after equipping, the top cover is closed;
    (a4) high-strength organic wastewater with the pH of 5~6 is kept supplying to the anaerobic hydrolysis-acidification reactor (1) by the pump (3), gradually increasing the load; and
    (a5) sewage is kept in the anaerobic hydrolysis-acidification reactor (1) for 2~6 h.

* * * * *